(12) United States Patent
Wu et al.

(10) Patent No.: US 8,422,459 B2
(45) Date of Patent: Apr. 16, 2013

(54) ROUTE OPTIMIZATION METHOD AND SYSTEM

(75) Inventors: Qin Wu, Shenzhen (CN); Jinwei Xia, Shenzhen (CN); Xiaoyu Gong, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 248 days.

(21) Appl. No.: 13/027,897

(22) Filed: Feb. 15, 2011

(65) Prior Publication Data

US 2011/0134885 A1    Jun. 9, 2011

Related U.S. Application Data

(63) Continuation of application No. PCT/CN2009/072427, filed on Jun. 24, 2009.

(30) Foreign Application Priority Data

Aug. 15, 2008  (CN) .......................... 2008 1 0134690

(51) Int. Cl.
*H04W 4/00* (2009.01)
*H04W 68/00* (2009.01)

(52) U.S. Cl.
USPC .................... 370/331; 455/426.1; 455/458

(58) Field of Classification Search ............ 370/331, 370/328; 455/426.1, 458; 713/168
See application file for complete search history.

(56) References Cited

U.S. PATENT DOCUMENTS

| 7,230,934 | B2 * | 6/2007 | Choi .......................... 370/313 |
| 7,499,437 | B2 * | 3/2009 | Das et al. .................... 370/338 |
| 2004/0114558 | A1 * | 6/2004 | Krishnamurthi et al. ..... 370/338 |
| 2006/0018291 | A1 | 1/2006 | Patel et al. |
| 2006/0018299 | A1 * | 1/2006 | Yamamoto ................... 370/349 |
| 2007/0104156 | A1 * | 5/2007 | Inoue et al. ................... 370/338 |
| 2007/0206538 | A1 * | 9/2007 | Mizukoshi et al. ........... 370/331 |
| 2008/0117845 | A1 | 5/2008 | Alfano et al. |
| 2008/0316956 | A1 * | 12/2008 | Turanyi et al. ............... 370/328 |
| 2010/0146610 | A1 * | 6/2010 | Kim et al. ......................... 726/7 |
| 2010/0182910 | A1 * | 7/2010 | Norefors et al. .............. 370/241 |
| 2010/0284331 | A1 * | 11/2010 | Weniger et al. ............... 370/328 |

FOREIGN PATENT DOCUMENTS

| CN | 101031158 A | 9/2007 |
| CN | 101047558 A | 10/2007 |
| CN | 101047637 A | 10/2007 |
| CN | 101136847 A | 3/2008 |

(Continued)

OTHER PUBLICATIONS

Kim, Draft Recommendation Y.NACF-R2, International Telecommunication Union, May 22, 2008, TD 85r1 (NGN-GSI), pp. 11-15.*

(Continued)

*Primary Examiner* — Asad Nawaz
*Assistant Examiner* — Nicholas Jensen
(74) *Attorney, Agent, or Firm* — Brinks Hofer Gilson & Lione (57) ABSTRACT

In the field of communication technologies, a route optimization method and system are provided, so as to improve the data transfer efficiency between a Mobile Node (MN) and a Corresponding Node (CN). The method includes: acquiring location information of a current access device of the CN, by a current anchor device of the MN (S201); and establishing a transmission tunnel between a current access device of the MN and the current access device of the CN (S202).

12 Claims, 7 Drawing Sheets

FOREIGN PATENT DOCUMENTS

| | | |
|---|---|---|
| CN | 101179457 A | 5/2008 |
| CN | 101247314 A | 8/2008 |
| CN | 101321384 A | 12/2008 |
| CN | 101465887 A | 6/2009 |
| CN | 101616065 A | 12/2009 |
| KR | 20040022696 A | 3/2004 |
| WO | WO 2008/018153 A1 | 2/2008 |
| WO | WO2008/071276 A1 | 6/2008 |

OTHER PUBLICATIONS

Rapporteur, Draft Recommendation Q.3202.1 (Q.nacf.auth1), Authentication Protocols based on EAP-AKA for Interworking among 3GPP, WiMax, and WLAN in NGN, Jan. 23, 2008, International Telecommunicaton Union, TD 181 (PLEN/11), pp. 5-16.*

International Search Report issued in corresponding PCT Application No. PCT/CN2009/072427; mailed Sep. 17, 2009.

Office Action issued in corresponding Korean Patent Application No. 10-2011-7004805; issued Jun. 12, 2012.

Written Opinion of the International Searching Authority issued in corresponding PCT Patent Application No. PCT/CN2009/072427, mailed Sep. 17, 2009.

Extended European Search Report issued in corresponding European Patent Application No. 09806324.1, Jul. 15, 2011.

Abeille et al., "Route Optimization for Proxy Mobile IPv6", NetLMM Working Group, May 23, 2007.

Gundavelli et al., "Proxy Mobile IPv6", NETLMM WG, May 30, 2008.

Calhoun et al., "Diameter Base Protocol", Network Working Group. The Internet Society, Sep. 2003.

International Telecommunication Union—Telecommunication Standardization Sector of ITU, "Mobility Management and Control Framework and Architecture Within the NGN Transport Stratum", Series Y: Global Information Infrastructure, Internet Protocol Aspects and Next-Generation Networks—Next Generation Networks—Frameworks and Functional Architecture Models. Y.2018, Sep. 2009.

Wu et al., "Bi-Directional Route Optimization in Mobile IP over Wireless LAN", IEEE 2002.

Soliman et al., "Hierarchical Mobile IPv6 Mobility Management (HMIPv6)", Network Working Group. Aug. 2005.

Office Action issued in corresponding Chinese Patent Application No. 200810134690.4, mailed Aug. 1, 2012.

Office Action issued in corresponding Chinese Patent Application No. 200810134690.4, mailed Oct. 8, 2011.

* cited by examiner

FIG. 8 and Accounting (AAA) server (not shown in FIG. 1), judges
ROUTE OPTIMIZATION METHOD AND SYSTEM

CROSS-REFERENCE TO RELATED APPLICATIONS

The application is a continuation of International Application No. PCT/CN2009/072427, filed on Jun. 24, 2009, which claims priority to Chinese Patent Application No. 200810134690.4, filed on Aug. 15, 2008, both of which are hereby incorporated by reference in their entireties.

FIELD OF THE TECHNOLOGY

The present invention relates to the field of communications technologies, and more particularly to a route optimization method and system.

BACKGROUND OF THE INVENTION

Mobility management is a solution for providing a consecutive session or connection to an end user, and can be realized through a host side or a network side. The mobility management of the host side requires a Mobile Node (MN) as a terminal to participate in the mobility management, and in the mobility management of the network side, a mobility agent of the network side participates in the mobility management in place of the MN.

Figure 1:
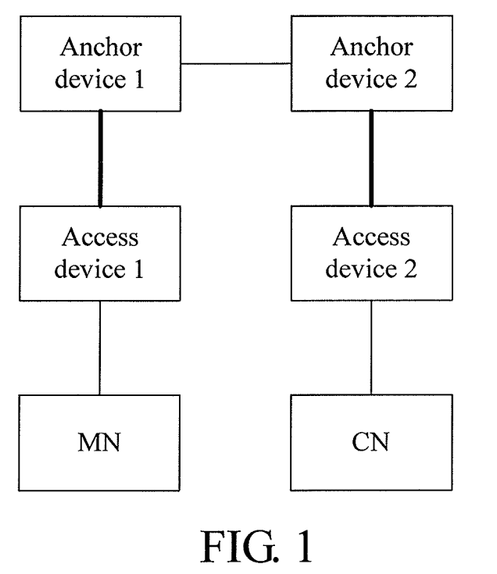
FIG. 1 is a schematic view of communication between an MN and a CN in a mobility management system in the conventional art.

FIG. 1 is a schematic view of a mobility management system in a conventional art. An MN is connected to a network through an access device. When the MN is connected to an access device 1, the access device 1 acquires a configuration file of the MN from an Authentication, Authorization, and Accounting (AAA) server (not shown in FIG. 1), judges whether the MN is authorized to access a mobility management service according to a user identifier of the MN, and then executes a location updating process to an anchor device 1 in place of the MN, if the MN is permitted to access a mobility management service; after a bidirectional tunnel is established between the access device 1 and the anchor device 1, the access device 1 establishes a data path for the service of the MN. In this case, the access device 1 acquires all the necessary information for simulating a home link of the MN, and informs the MN of a prefix of the home link, so that the MN believes that the MN is always in the same home link wherever the MN is moved.

According to the above manner, when the MN communicates with a Corresponding Node (CN), the anchor device 1, as a topological anchor point of a home prefix of the MN, captures any packet sent to the MN and sends the packet to the access device 1 through the tunnel between the anchor device 1 and the access device 1, and the access device 1 forwards the packet to the MN. When receiving any packet from the MN, the access device 1 sends the packet to the anchor device 1 of the MN through the tunnel between the access device 1 and the anchor device 1, the anchor device 1 receives and sends the packet to an anchor device 2 of the CN, and the anchor device 2 sends the packet to the CN through an access device 2 of the CN.

The inventors found in research that although the above method realizes communication between the MN and the CN, the data transmission path between the MN and the CN is not optimal, as the packet transmitted between the MN and the CN requires two times of encapsulating and decapsulating processes, that is, the transmitted packet requires the encapsulation and decapsulation for the tunnel between the anchor device 1 and the access device 1 of the MN, and the encapsulation and decapsulation for the tunnel between the anchor device 2 and the access device 2 of the CN, so that the route is complicated especially when the anchor devices between the MN and the CN are far away from each other, and thus the data transfer efficiency between the MN and the CN is low.

SUMMARY OF THE INVENTION

The present invention is directed to a route optimization method and system, so as to improve the data transfer efficiency between the MN and the CN.

In order to achieve the above objectives, the present invention provides the following technical solutions.

A route optimization method includes:
acquiring, by a current anchor device of an MN, location information of a current access device of a CN;
establishing a transmission tunnel between a current access device of the MN and the current access device of the CN.

A route optimization system includes:
an MN access sub-system, configured to acquire a location of a current access device of a CN in a CN access sub-system, through a current anchor device of an MN, and establish a transmission tunnel between a current access device of the MN and the current access device of the CN; and
the CN access sub-system, configured to acquire a location of the current access device of the MN in the MN access sub-system, and establish a transmission tunnel between the current access device of the CN and the current access device of the MN.

According to the route optimization method and system of the present invention, a transmission tunnel is established between a current access device of an MN and a current access device of a CN, by finding a location of the current access device of the CN. Compared with the route between the anchor devices in the transmission process in the conventional art that is complicated and requires two times of encapsulating and decapsulating processes, the data transmission path is shortened, and in transmission in a straight-through tunnel between the current access device of the MN and the current access device of the CN, a packet requires only one time of encapsulating and decapsulating processes, so that the route is optimized, and the data transfer efficiency between the MN and the CN is improved.

DETAILED DESCRIPTION OF THE EMBODIMENTS

Hereinafter, the route optimization method and system of the present invention will be described in detail with reference to the accompanying drawings.

Embodiment 1

Figure 2:
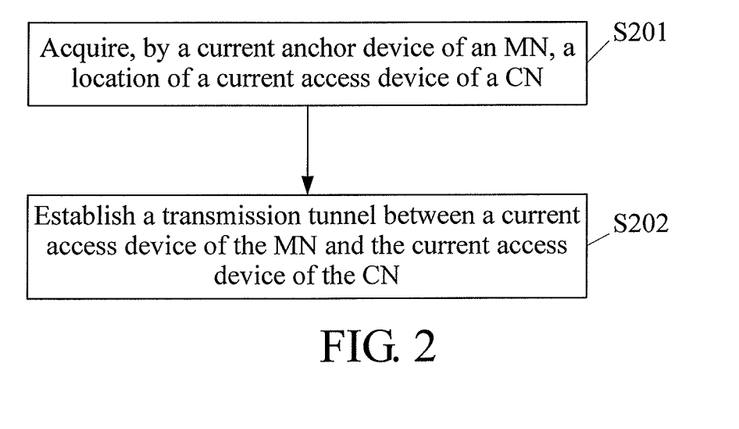
FIG. 2 is a schematic flowchart of a route optimization method according to Embodiment 1 of the present invention.

In order to optimize a route between an MN and a CN, and improve the data transfer efficiency between the MN and the CN, this embodiment provides a route optimization method. As shown in FIG. 2, the method includes the following steps.

In step S201, a current anchor device of the MN acquires location information of a current access device of the CN. An anchor device includes the current anchor device of the MN and the current anchor device of the CN, and is a central mobility management control device, configured to converge messages of subordinate nodes belonging to its own management domain.

Before step S201, the method further includes the following.

The current anchor device of the MN looks up its own binding list, and judges whether the CN and the MN have performed location registration locally, that is, judges whether both the MN and the CN belong to its own management domain. Since the anchor device stores the registration list information (or referred to as binding list) of the subordinate nodes, and a constant location identifier of a node may be used as an index of a corresponding binding entry in the binding list, the anchor device may judge whether the node is in the management domain of the anchor device according to the constant location identifier of the node. The constant location is a constant address of the MN or the CN, for example, a home address in a mobile IP, and thus the constant location identifier is a measure of the constant location. Whether the CN and the MN have performed location registration locally is judged by looking up the own binding list by the anchor device of the MN; if the CN and the MN have performed location registration locally, the current anchor device of the MN is also the current anchor device of the CN, and the anchor device can directly acquire locally the location information of the current access device of the CN, and directly send the location information to the current access device of the MN; and if the CN performs location registration in another anchor device, the current anchor device of the MN has to remotely find the location information of the current access device of the CN. For example, the location information of the current access device of the CN can be found by a paging mechanism, a function entity of an AAA server and a user identifier, or a query mechanism of the application layer.

In step S202, a transmission tunnel is established between the current access device of the MN and the current access device of the CN.

According to this embodiment, a transmission tunnel is established between the current access device of the MN and the current access device of the CN, by finding the location of the current access device of the CN. Corresponding to FIG. 1, a straight-through tunnel connecting the access device 1 and the access device 2 is established to transfer data in this embodiment. Compared with the route between the anchor devices in the transmission process in the conventional art that is complicated and requires two times of encapsulating and decapsulating processes, in this embodiment, the data transmission path is shortened, and the number of times of the encapsulating and decapsulating processes is decreased, so that the route is optimized, and the data transfer efficiency between the MN and the CN is improved.

Hereinafter, the route optimization method in accordance with embodiments of the present invention will be described in detail.

Embodiment 2

Figure 3:
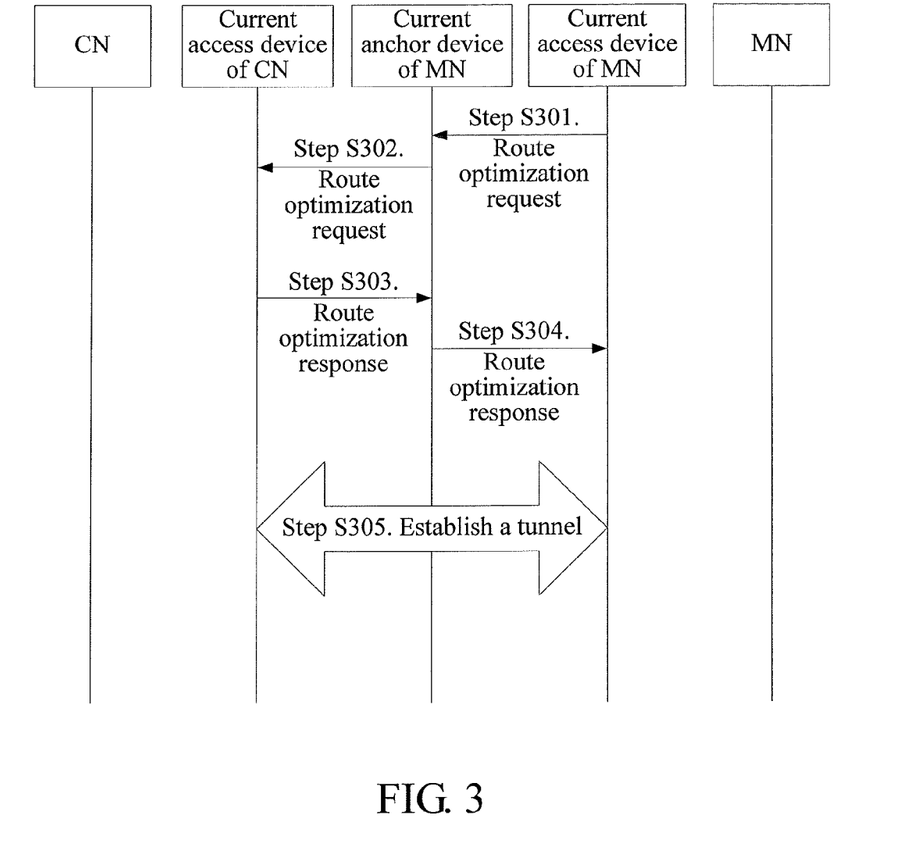
FIG. 3 is a schematic flowchart of a route optimization method according to Embodiment 2 of the present invention.

In this embodiment, both a current access device of an MN and a current access device of a CN lie in a management domain of a current anchor device of the MN. As shown in FIG. 3, the method includes the following steps.

In step S301, the current access device of the MN sends a route optimization request to the current anchor device of the MN.

The sent route optimization request carries a constant location identifier of the CN, and may further carry a route optimization indication, which is used for negotiating an initiator for establishing a tunnel.

In step S302, after receiving the route optimization request, the anchor device of the MN looks up a binding entry corresponding to a constant location identifier of the CN stored in a binding entry buffer, and determines that the MN and the CN lie in the same management domain; therefore, the current anchor device of the MN is also the current anchor device of the CN. The current anchor device of the MN can acquire location information of the current access device of the CN through the binding entry, and sends the route optimization request to the current access device of the CN. The route optimization request message may also function to test the route reachability, that is, check whether the communication between the current access device of the CN and the current anchor device of the MN is normal.

The request may carry a route optimization indication of the MN and location information of the current access device of the MN. The location information of the current access device of the MN can be acquired by looking up the binding list, or by resolving the message sent from the current access device of the MN.

When the route optimization request, sent from the current access device of the MN to the current anchor device of the MN, carries a route optimization indication, the current anchor device of the MN extracts the route optimization indication, and informs the current access device of the CN through the route optimization indication that the current access device of the MN initiates the establishment of a tunnel.

When the route optimization request, sent from the current access device of the MN to the current anchor device of the MN, carries no route optimization indication, the current anchor device of the MN may carry a route optimization indication in the route optimization request sent to the current access device of the CN, and appoint the current access device of the CN as the initiator for establishing a tunnel.

In step S303, after receiving the route optimization request, the current access device of the CN determines the initiator for establishing a tunnel, according to the route optimization indication; and the current access device of the CN returns a route optimization response to the current anchor device of the MN, where the response carries a confirmation information of the route optimization indication.

In step S304, after receiving the route optimization response from the current access device of the CN, the current anchor device of the MN sends a route optimization response to the current access device of the MN, where the response carries location information of the current access device of the CN.

In step S305, a tunnel is established. The tunnel is a straight-through tunnel between the current access device of the MN and the current access device of the CN. Step S305 includes the following specific sub-steps.

In step S305.1, the initiator for establishing a tunnel is determined according to the route optimization indication.

In step S305.2, a location relationship between the current access device of the MN and the current access device of the CN is bound in the current access device of the MN and/or the current access device of the CN.

If the route optimization indication determines the current access device of the MN as the initiator for establishing a tunnel, the current access device of the MN sends a location binding update request to the current access device of the CN, so as to establish a location binding relationship on the current access device of the CN; and then the current access device of the CN may execute a location binding establishment or update process to the current access device of the MN, that is, establish a location binding relationship on the current access device of the MN. The location binding relationship at least binds the location relationship between the current access device of the CN and the current access device of the MN.

If the route optimization indication determines the current access device of the CN as the initiator for establishing a tunnel, the current access device of the CN sends a location binding update request to the current access device of the MN, so as to establish a location binding relationship on the current access device of the MN; and then the current access device of the MN may execute a location binding establishment or update process to the current access device of the CN, that is, establish a location binding relationship on the current access device of the CN. The location binding relationship at least binds the location relationship between the current access device of the CN and the current access device of the MN.

The established binding relationship further includes binding the location relationship between the current access device of the MN and the CN and/or the MN; and/or binding the location relationship between the current access device of the CN and the MN and/or the CN.

For example, after establishing a tunnel, the access device of the MN generally needs to acquire location information of the access device of the CN according to the constant location identifier of the CN in a data transmission process, so that the location relationship between the access device of the MN and the CN may be further bound in the bound location relationship; and the relationship between the access device of the MN and the constant location identifier of the MN may also be bound in the access device of the MN. The richer the content in the bound location relationship is, the higher the efficiency of the tunnel for finding and forwarding the data in transmission will be. Therefore, the tunnel needed can be found rapidly according to the related information of the CN or according to the related information of the MN. The relationship between the current access device of the MN and the constant location identifier of the MN may not be bound in the current access device of the MN, as long as the successful forwarding can be achieved in a data transmission process. The determination of the binding relationships can be manually set flexibly. Likewise, the location relationship between the current access device of the CN and the MN and/or the CN can be bound in the current access device of the CN. The establishment and maintenance of the binding relationships in the access device of the CN are the same as those of the binding relationships in the existing anchor device.

In step S305.3, a location management module in the current access device of the MN sends a tunnel trigger message to a handover control module in the current access device of the MN, and a location management module in the current access device of the CN also sends a tunnel trigger message to a handover control module in the current access device of the CN.

In step S305.4, the handover control module in the current access device of the MN controls a handover execution module in the current access device of the MN to establish a tunnel from the current access device of the MN to the current access device of the CN, and the handover control module in the current access device of the CN controls a handover execution module in the current access device of the CN to establish a tunnel from the current access device of the CN to the current access device of the MN.

In the above step S305.1 to step S305.4, a bidirectional tunnel is established. The established tunnel is generally correlated to the initiator in a certain manner. The initiator of the tunnel may either be the current access device of the MN or the current access device of the CN, or both the current access device of the MN and the current access device of the CN initiate tunnel establishment at the same time; in the first case, a unidirectional tunnel is suitably established first to transfer a packet, then location information of the peer end is acquired from the encapsulated packet, and finally, a bidirectional tunnel is established according to the location information; and in the second case, the establishment of a bidirectional tunnel may be completed directly, and requires, before initiating the establishment of a tunnel, that, on the one hand, the current access device of the MN acquires the location information of the current access device of the CN; and on the other hand, the current access device of the CN acquires the location information of the current access device of the MN, where the location information may be carried in the route optimization request, and finally forwarded to the current access device of the CN.

Figure 4:
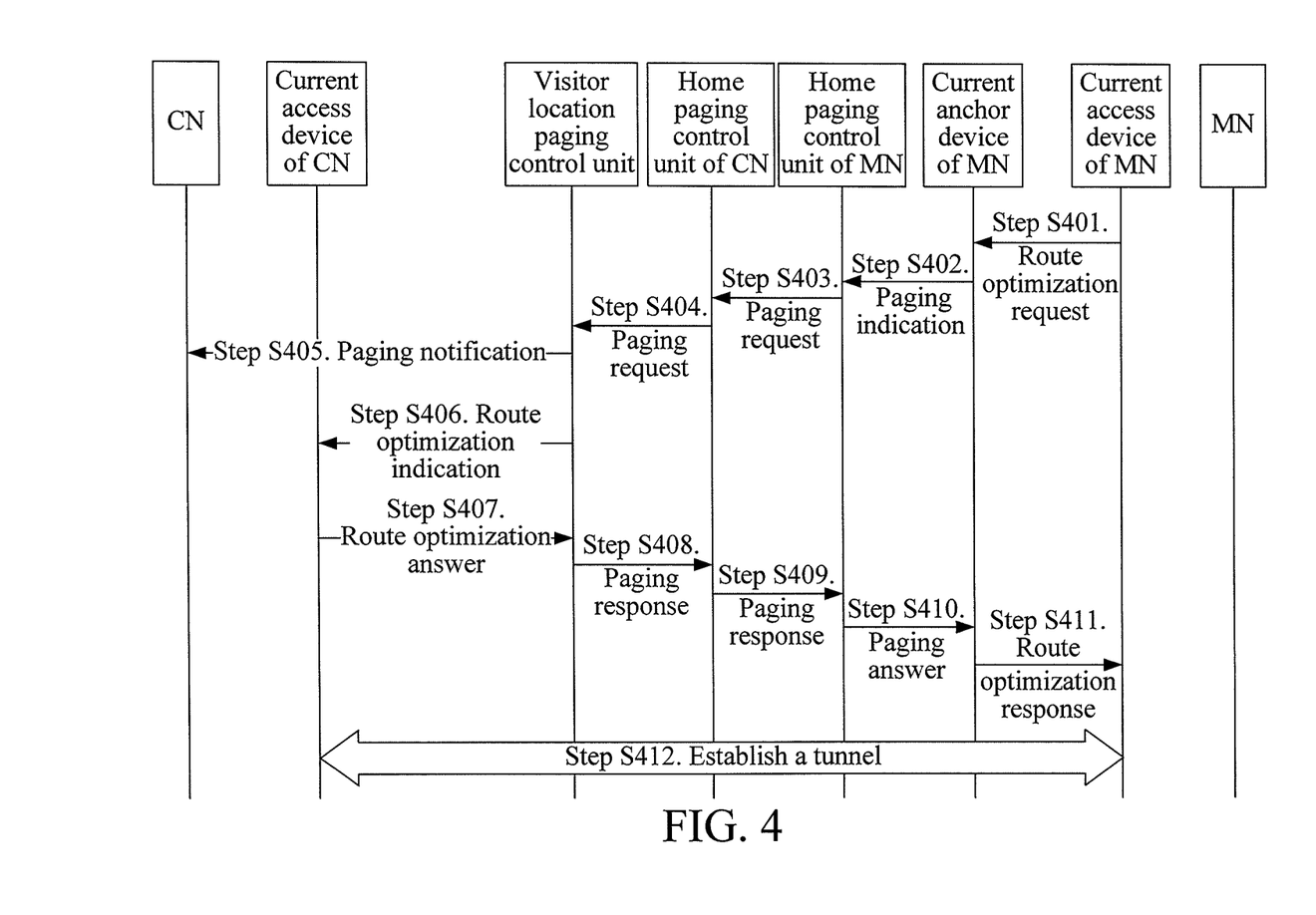
FIG. 4 is a schematic flowchart of a route optimization method according to Embodiment 3 of the present invention.
Figure 5:
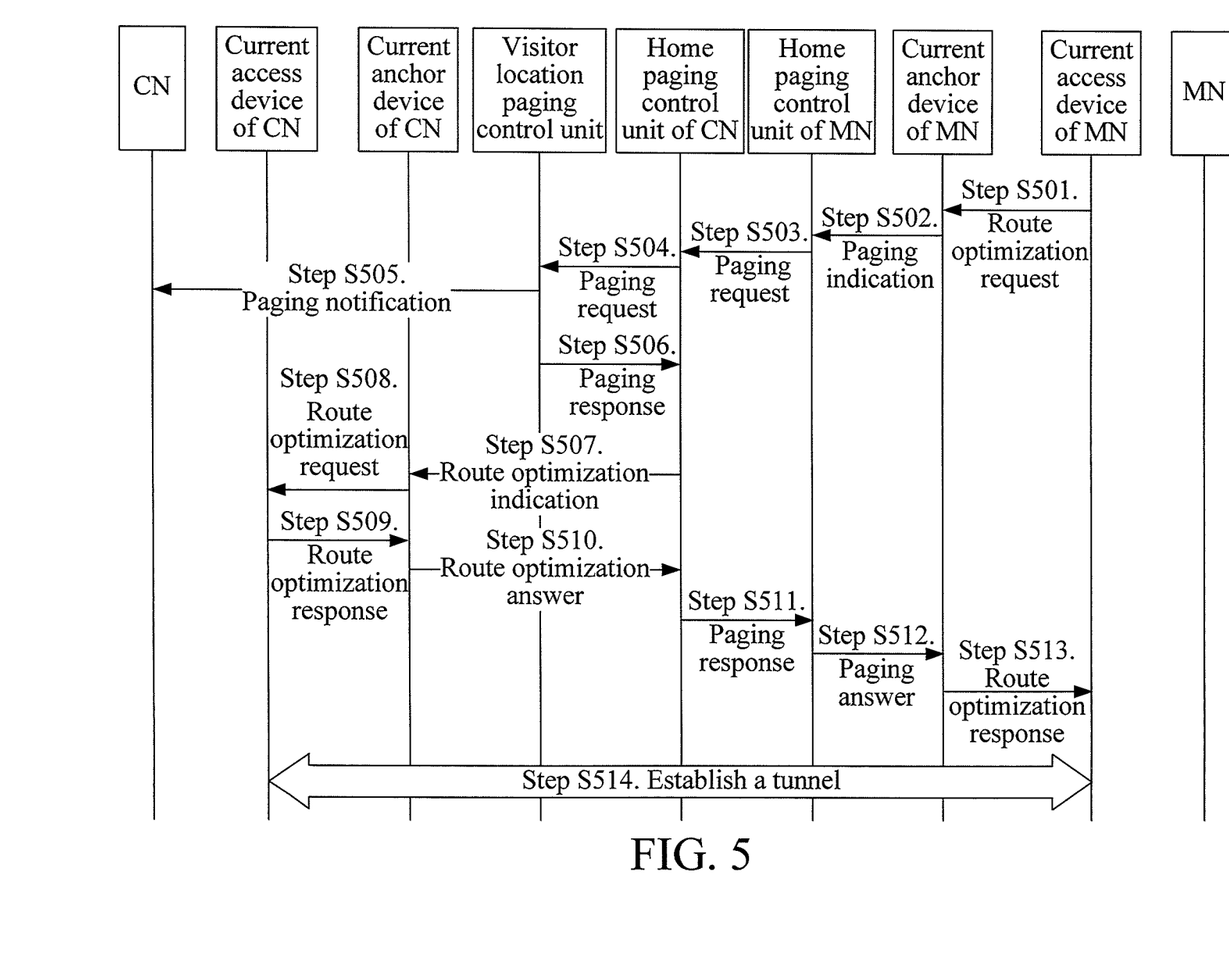
FIG. 5 is a schematic flowchart of another route optimization method according to Embodiment 3 of the present invention.

In this embodiment, the access device (including the current access device of the MN and the current access device of the CN) includes a location management module, a handover control module, and a handover execution module, and the anchor device also includes a location management module, a handover control module, and a handover execution module. If the handover execution module in the access device is replaced by a Tunnel Execution Function (TEF) of a bearer plane, the location management modules in the access devices directly trigger the respective TEFs to establish a tunnel from such the access device to the corresponding access device, without the participation of the correlated handover control modules in the establishment of the tunnel. The location management module maintains a current location of a mobile terminal under normal conditions, and triggers the creation, deletion, and update of a bearer plane tunnel. The handover control module controls the establishment of a bearer path, and is responsible for the transfer of a handover context. A paging control unit may further be integrated into the access device or the anchor device. The location management module can interact with the paging control unit, and save current location and state information of the MN or the CN in a paging mode; and the paging control unit wakes the MN or the CN up, and interacts with the location management module, so as to convey the current location and state information of the MN or the CN to the location management module. The modules in the same device may be independent or integrated to each other. Therefore, the above paging control unit may be independently deployed as shown in FIGS. 4 and 5 in Embodiment 3 below.

In this embodiment, the sender of the route optimization request may be the location management module or the handover control module of the current access device of the MN.

Accordingly, the sending, by the current anchor device of the MN, the location information of the current access device of the CN to the current access device of the MN includes the following two cases.

In the first case that the current access device of the MN sends a route optimization request through the location management module, the current anchor device of the MN sends the location information of the current access device of the CN to the location management module of the current access device of the MN.

In the second case that the current access device of the MN sends a route optimization request through the handover control module, the current anchor device of the MN sends the location information of the current access device of the CN to the handover control module of the current access device of the MN.

According to this embodiment, a transmission tunnel is established between the current access device of the MN and the current access device of the CN by finding the location information of the current access device of the CN in the local mobility management, so as to shorten the data transmission path, and decrease the number of times of the encapsulating and decapsulating processes of a packet in transmission, so that the route is optimized and the data transfer efficiency between the MN and the CN is improved.

Embodiment 3

In this embodiment, a location of a current access device of a CN which performs location registration in another anchor device is found by a paging mechanism, where an MN is in a roaming state. The method is described in the following two cases.

In the first case, as shown in FIG. 4, the route optimization method includes the following steps.

In step S401, a current anchor device of the MN receives a route optimization request sent from a current access device of the MN, where the route optimization request carries a constant location identifier of the CN;

In step S402, after receiving the route optimization request, the current anchor device of the MN extracts the constant location identifier of the CN, and sends a paging indication to a home paging control unit of the MN and informs the home paging control unit of the MN of the route optimization request from the MN, as a location binding buffer entry corresponding to the constant location identifier of the CN cannot be found in the current anchor device of the MN. A paging control unit saves paging state information and current location information of the subordinate nodes, and may be integrated into a corresponding anchor device, or placed in a physical device independent of the anchor device.

In step S403, the home paging control unit of the MN queries a current location information of the CN, and finds that the CN belongs to a management domain of another paging control unit. In this case, the home paging control unit of the MN sends a paging request to a home paging control unit of the CN.

In step S404, the home paging control unit of the CN queries the current location information of the CN, and finds that the CN is roaming in a foreign network. In this case, the home paging control unit of the CN sends a paging request to a currently subordinate paging control unit of the CN, namely, the visited location paging control unit.

In step S405, as the paging control unit saves the paging state of the subordinate node, when the CN is in an idle state, the visited location paging control unit sends a paging notification to the CN, and wakes the CN up.

In step S406 and step S407, the visited location paging control unit sends a route optimization indication to the current access device of the CN, and the current access device of the CN returns a route optimization answer.

In step S408 and step S409, after receiving the route optimization answer from the current access device of the CN, the visited location paging control unit returns a paging response to the home paging control unit of the CN, and then the home paging control unit of the CN returns a paging response to the home paging control unit of the MN.

In step S410 and step S411, the home paging control unit of the MN returns a paging answer to the current anchor device of the MN, and the current anchor device of the MN returns a route optimization response to the current access device of the MN.

Step S412 is the same as step S305, and the details thereof will not be described herein again.

Step S404 to step S411 accomplish the following.

The home paging control unit of the CN queries the location information of the current access device of the CN according to the constant location identifier of the CN, and sends a paging request to the visited location paging control unit, so as to acquire the location information of the current access device of the CN, when the CN is in a roaming state; and forwards the location information of the current access device of the CN to the current anchor device of the MN.

In the first case, after waking the CN up, the visited location paging control unit directly sends a route optimization indication to the access device of the CN, where the indication carries the location information of the access device of the MN.

In the second case, as shown in FIG. 5, the route optimization method includes the following steps.

Step S501 to step S505 are the same as step S401 to step S405, and the details thereof will not be described herein again.

In step S506, after waking a CN up, a visited location paging control unit returns a paging response to a home paging control unit of the CN.

In step S507, the home paging control unit of the CN sends a route optimization indication to a current anchor device of the CN, where the indication may carry a location identifier of a current access device of an MN, and a route optimization indication.

In step S508 and step S509, the current anchor device of the CN sends a route optimization request to a current access device of the CN, and receives a route optimization response from the current access device of the CN.

In step S510, the current anchor device of the CN returns a route optimization answer to the home paging control unit of the CN, where the message carries location information of the current access device of the CN, which is acquired from location binding information maintained by the current anchor device of the CN.

Step s511 to step S514 are the same as step S409 to step S412, and the details thereof will not be described herein again.

In the second case, after waking the CN up, the current anchor device of the CN is further required to interact with the visited location paging control unit, so that the current access device of the CN may acquire the location information of the current access device of the MN through the route optimization request sent from the current anchor device of the CN.

According to this embodiment, in a situation that the MN is in a roaming state, and especially in an idle state, a transmission tunnel is established between the current access device of the MN and the current access device of the CN by finding the location information of the current access device of the CN through a paging mechanism, so as to shorten the data transmission path, and decrease the number of times of the encapsulating and decapsulating processes of a packet in transmission, so that the route is optimized and the data transfer efficiency between the MN and the CN is improved.

Embodiment 4

Figure 6:
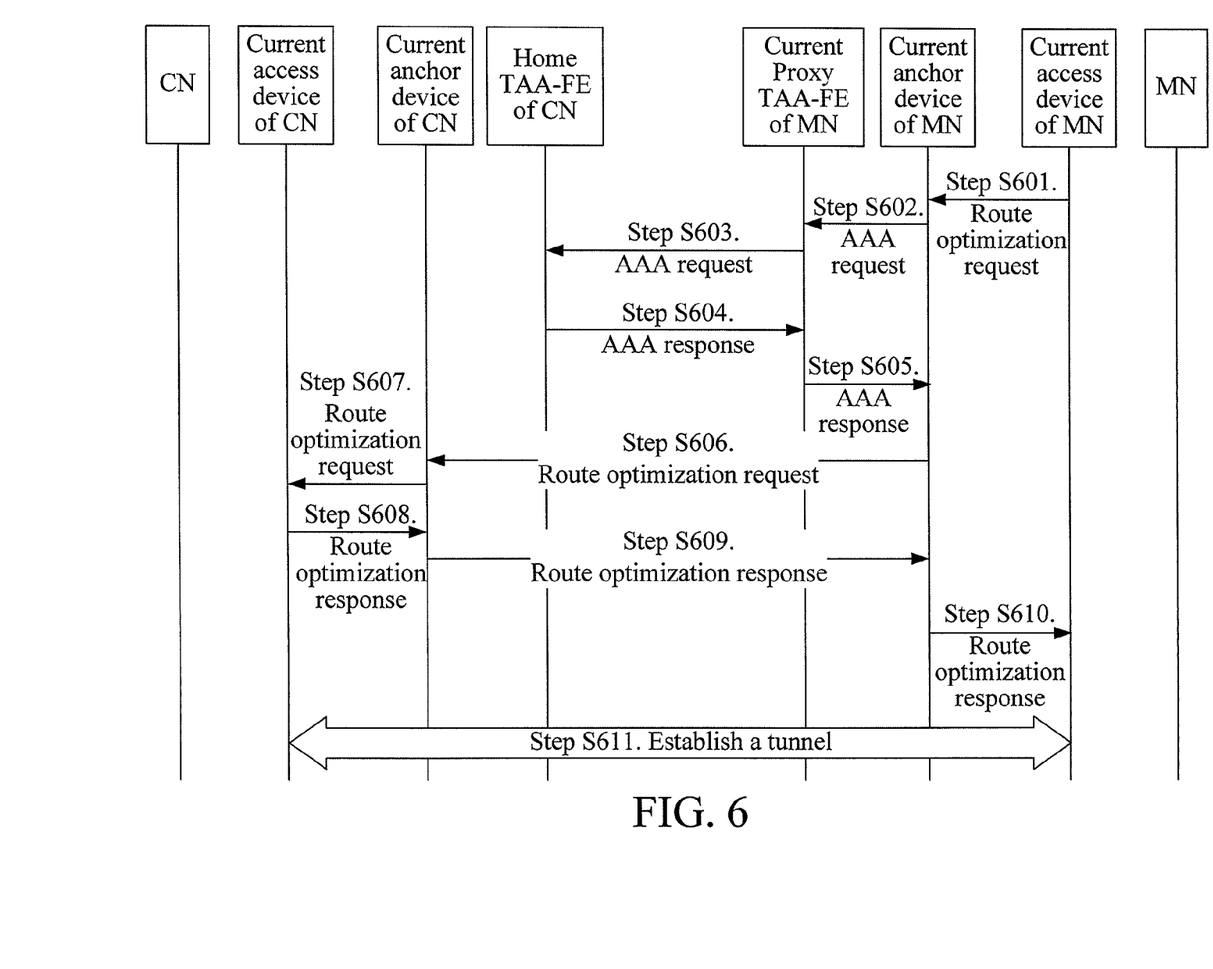
FIG. 6 is a schematic flowchart of a route optimization method according to Embodiment 4 of the present invention.

In this embodiment, a location of a current access device of a CN is found by a function entity of an AAA server and a user identifier of the CN, where an MN is in a roaming state, and may also be in an activated state. As shown in FIG. 6, the route optimization method includes the following steps.

In step S601, a current access device of the MN sends a route optimization request to a current anchor device of the MN, where the route optimization request carries constant location information of the CN, and may further carry a route optimization indication used for negotiating an initiator for establishing a tunnel.

In step S602, after receiving a route optimization request, due to the incapability of finding a binding buffer entry corresponding to the constant location identifier of the CN, the current anchor device of the MN acquires the user identifier of the CN, and sends an AAA request to a current Proxy Transport Authentication Authorization-Function Entity (Proxy TAA-FE), so as to query an address of a current anchor device of the CN, where the request carries the user identifier of the CN.

In step S603 to step S604, the current Proxy TAA-FE of the MN interacts with a Home Transport Authentication Authorization-Function Entity (Home TAA-FE) of the CN through AAA signaling, and looks up location information of the current anchor device of the CN in a Home TAA-FE domain, according to the user identifier of the CN.

In step S605, the Proxy TAA-FE informs the current anchor device of the MN of the location information of the current anchor device of the CN.

It is accomplished in step S603 to step S605 that the current Proxy TAA-FE of the MN looks up the location information of the current anchor device of the CN in the Home TAA-FE of the CN, according to the user identifier of the CN, and sends the location information of the current anchor device of the CN to the current anchor device of the MN.

In step S606, the current anchor device of the MN sends a route optimization request to the current anchor device of the CN, according to the location information of the current access device of the CN, where the request may carry a route optimization indication which can be retrieved from the route optimization request sent from the current access device of the MN to the current anchor device of the MN.

In the optional step S607 and step S608, the current anchor device of the CN sends a route optimization request to the current access device of the CN, and informs that the current access device of the MN is intended to establish an optimized routing tunnel with the current access device of the CN, as well as informs the location information of the current access device of the MN, where the request carries a route optimization indication; the current access device of the CN sends a route optimization response to a current anchor point of the CN; and the interaction between the current anchor device of the CN and the current access device of the CN may function to test the route reachability.

In step S609, the current anchor device of the CN sends a route optimization response to the current anchor device of the MN, where the response carries location information of the current access device of the CN, and the location information may be acquired from a central location management module in the current anchor device of the CN.

In step S610, the current anchor device of the MN sends a route optimization response to the current access device of the MN, where the response carries the location information of the current access device of the CN.

It is accomplished in step S606 to step S610 that the current anchor device of the MN acquires the location information of the current access device of the CN from the current anchor device of the CN, and forwards the location information to the current access device of the MN.

Step S611 is the same as step S305, and the details thereof will not be described herein again.

According to this embodiment, in a situation that the MN is in a roaming state, and especially in an activated state, a transmission tunnel is established between the current access device of the MN and the current access device of the CN by finding the location of the current access device of the CN through a paging mechanism, so as to shorten the data transmission path, and decrease the number of times of the encapsulating and decapsulating processes of a packet in transmission, so that the route is optimized and the data transfer efficiency between the MN and the CN is improved.

The activated state as mentioned in this embodiment and that the idle state as mentioned in Embodiment 3 are two states of the MN after accessing a network: connected mode and idle mode. Generally, when a service runs on a node, the connected mode is needed to be maintained, so that the location of the node in the network may be accurately known, and thus related services can be provided for the node. When the node does not send or receive any service for a period of time, the node is switched to the idle mode, which can be initiated from the node or the network side, so that the node can achieve energy and power saving. For the node in the idle mode, if the node intends to initiate a service, or a related service of the node is received in the network, the node is switched from the idle mode to the connected mode.

Embodiment 5

Figure 7:
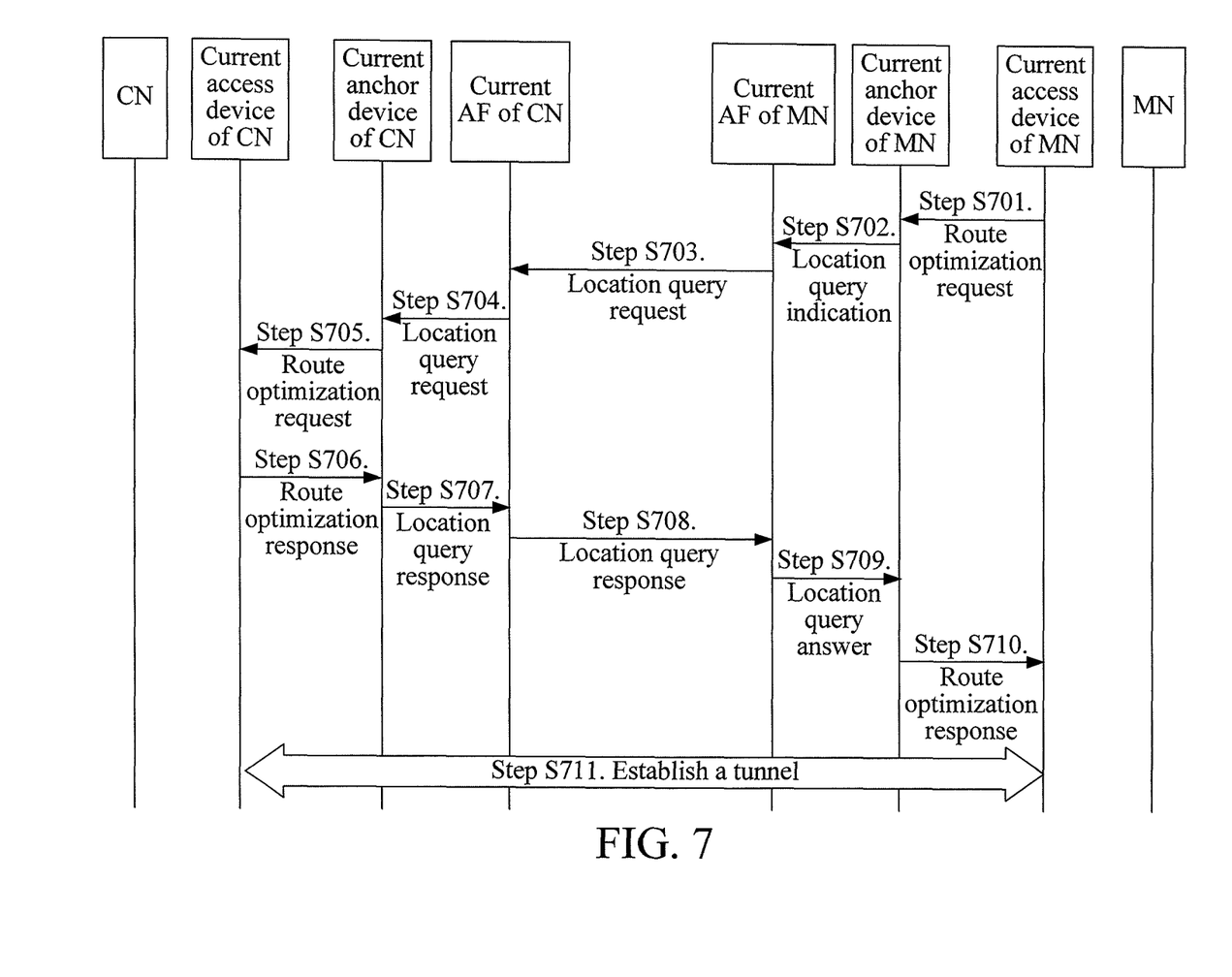
FIG. 7 is a schematic flowchart of a route optimization method according to Embodiment 5 of the present invention.

In this embodiment, a location of a current access device of a CN is found by a query mechanism of an application layer. As shown in FIG. 7, the route optimization method includes the following steps.

In step S701, a current access device of an MN initiates a route optimization request to a current anchor device of the MN, where the request carries constant location information and a user identifier of the CN.

In step S702 and step S703, when a corresponding binding buffer entry cannot be locally looked up according to the constant location information of the CN, the current anchor device of the MN initiates a location query indication to a current Application Function (AF) of the MN, and then the current AF of the MN initiates a location query request to a current AF of the CN according to the user identifier of the CN.

In step S704, after receiving the location query request, the current AF of the CN initiates the location query request to a current anchor device of the CN.

In step S705 and step S706, the current anchor device of the CN initiates a route optimization request to the current access device of the CN, where the request may carry the location information of the current access device of the MN; and the current access device of the CN returns a route optimization response to the current anchor device of the CN.

In step S707 and step s708, the current anchor device of the CN returns a location query response to the current AF of the CN. The response carries the location information of the current access device of the CN, and then the current AF of the CN returns a location query response to the current AF of the MN, where the response carries the location information of the current access device of the CN.

In step S709, the current AF of the MN returns a location query answer to the current anchor device of the MN, where the answer carries the location information of the current access device of the CN.

It is accomplished in the above step S704 to step S709 that the current AF of the CN sends a location query request to the current anchor device of the CN, so as to acquire the location information of the current access device of the CN, and then forwards the location information to the current access device of the MN.

In step S710, the current anchor device of the MN returns a route optimization response to the current access device of the MN, where the response carries the location information of the current access device of the CN.

In step S711, a tunnel is established. The step is the same as step S305, and the details thereof will not be described herein again.

According to this embodiment, a transmission tunnel is established between the current access device of the MN and the current access device of the CN, by finding the location of the current access device of the CN through a query mechanism of an application layer, so as to shorten the data transmission path, and decrease the number of times of the encapsulating and decapsulating processes of a packet in transmission, so that the route is optimized and the data transfer efficiency between the MN and the CN is improved.

Embodiment 6

Figure 8:
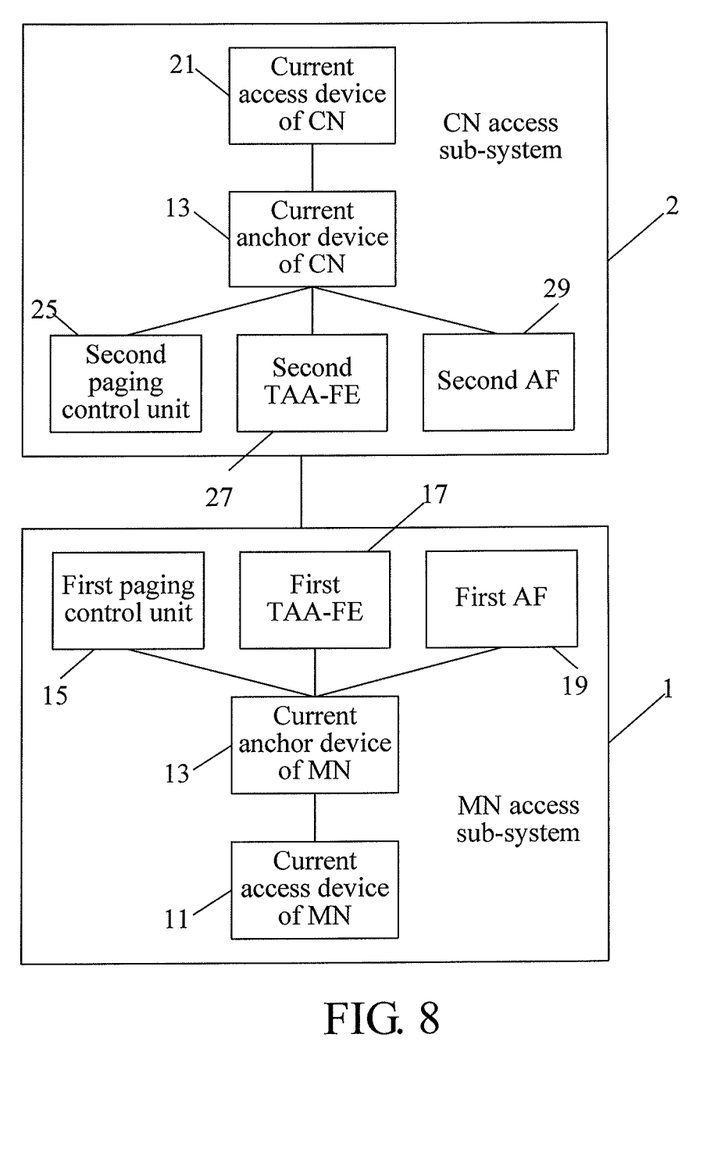
FIG. 8 is a schematic structural view of a route optimization system according to Embodiment 6 of the present invention.

In order to optimize a route between an MN and a CN, and improve the data transfer efficiency between the MN and the CN, a route optimization system is provided in this embodiment. As shown in FIG. 8, the route optimization system includes an MN access sub-system 1 and a CN access sub-system 2.

The MN access sub-system 1 is configured to acquire a location information of a current access device 21 of the CN in the CN access sub-system, through a current anchor device 13 of the MN, and establish a transmission tunnel between a current access device 11 of the MN and the current access device 21 of the CN.

The CN access sub-system 2 is configured to acquire a location information of the current access device 11 of the MN in the MN access sub-system, and establish a transmission tunnel between the current access device 21 of the CN and the current access device 11 of the MN.

The current anchor device 11 of the MN and the current anchor device 21 of the CN are a central mobility management control device, configured to converge messages of subordinate nodes belonging to its own management domain.

The MN access sub-system 1 includes the current access device 11 of the MN and the current anchor device 13 of the MN.

The current access device 11 of the MN is configured to query the location information of the current access device 21 of the CN from the current anchor device 13 of the MN, bind a location relationship between the current access device 11 of the MN and the current access device 21 of the CN, and establish a transmission tunnel between the current access device 11 and the current access device 21 of the CN.

The current anchor device 13 of the MN is configured to determine an initiator for establishing a tunnel, acquire the location information of the current access device 21 of the CN, and send the location information of the current access device 21 of the CN to the current access device 11 of the MN.

The MN access sub-system 1 may further include at least one of a first paging control unit 15, a first TAA-FE 17, and a first AF 19, where the first paging control unit 15 may be the home paging control unit of the MN as shown in FIGS. 4 and 5, the first TAA-FE 17 may be the current Proxy TAA-FE of the MN as shown in FIG. 6, and the first AF 19 may be the current AF of the MN as shown in FIG. 7.

The first paging control unit 15 is configured to query the location information of the current access device 21 of the CN according to a constant location identifier of the CN.

The first TAA-FE 17 is configured to query a location information of a current anchor device 23 of the CN according to a user identifier of the CN, so that the current anchor device 13 of the MN is capable of querying the location information of the current access device 21 of the CN from the current anchor device 23 of the CN.

The first AF 19 is configured to query the location information of the current access device 21 of the CN in the application layer according to the user identifier of the CN.

The CN access sub-system 2 includes the current anchor device 21 of the CN and the current access device 23 of the CN.

The current anchor device 23 of the CN is configured to send the location information of the current access device 11 of the MN to the current access device 21 of the CN.

The current access device 21 of the CN is configured to receive the location information of the current access device 11 of the MN sent from the current anchor device 23 of the CN, bind a location relationship between the current access device 21 of the CN and the current access device 11 of the MN, and establish a transmission tunnel between the current access device 21 of the CN and the current access device 11 of the MN.

The CN access sub-system 2 further includes, corresponding to the MN access sub-system 1, at least one of: a second paging control unit 25, a second TAA-FE 27, and a second AF 29.

The second paging control unit 25 is configured to query the location information of the current access device 21 of the CN according to the constant location identifier of the CN.

The second TAA-FE 27 is configured to query the location information of the current access device 21 of the CN according to the user identifier of the CN.

The second AF 29 is configured to query the location information of the current access device 21 of the CN from the current anchor device 23 of the CN according to the user identifier of the CN.

When the first paging control unit 15 may be the home paging control unit of the MN as shown in FIGS. 4 and 5, the first TAA-FE 17 may be the current Proxy TAA-FE of the MN as shown in FIG. 6, and the first AF 19 may be the current AF of the MN as shown in FIG. 7; correspondingly, the second paging control unit 25 may be the home paging control unit of the CN as shown in FIG. 4 (may further include a foreign paging control unit), the second TAA-FE 27 may be the Home TAA-FE of the CN as shown in FIG. 5, and the second AF 29 may be the current AF of the CN as shown in FIG. 6.

In this embodiment, the first paging control unit 15 and the first AF 19 may be integrated in the current anchor device of the MN, and may also be placed in a physical device independent of the current anchor device of the MN. Likewise, the second paging control unit 25 and the second AF 29 may be integrated in the current anchor device 23 of the CN, and may also be placed in a physical device independent of the current anchor device 23 of the CN.

In this embodiment, both the access devices (11, 21) and the anchor devices (13, 23) include a location management module, a handover control module, and a handover execution module. Moreover, the handover execution function may be replaced by a TEF in a bearer plane. The location management module maintains a current location information of a host under normal conditions, and triggers the creation, deletion, and update of a tunnel in the bearer plane. The handover control module controls the establishment of the path in the bearer plane, and is responsible for the transfer of a handover context. A paging control unit may be further integrated into the access device or the anchor device. The location management module may interact with the paging control unit, and save current location and state information of the MN or the CN in a paging mode; and the paging control unit wakes the MN or the CN up, and interacts with the location management module, so as to convey the current location and state information of the MN or the CN to the location management module. The modules in the same device may be independent or integrated to each other. Therefore, the paging control unit may be independently deployed as shown in FIGS. 4 and 5 in Embodiment 3.

According to the route optimization system provided in this embodiment, a transmission tunnel is established between the current access device 11 of the MN and the current access device 21 of the CN, by finding the location of the current access device 21 of the CN. Compared with the route between the anchor devices in the transmission process in the conventional art that is complicated and requires two times of encapsulating and decapsulating processes, in this embodiment, the data transmission path is shortened, and in transmission in a straight-through tunnel between the current access device 11 of the MN and the current access device 21 of the CN, a packet requires only one time of encapsulating and decapsulating processes, so that the route is optimized, and the data transfer efficiency between the MN and the CN is improved.

Though all the embodiments above are described based on the mobility management of the network side, they are also applicable in a situation of the mobility management of the host side, with the difference that the route optimization request is initiated by the MN in the later situation.

The above descriptions are merely some exemplary embodiments of the present invention, but not intended to limit the scope of the present invention. Any modification, equivalent replacement, or improvement made without departing from the spirit and principle of the present invention should fall within the scope of the present invention. Therefore, the protection scope of the present invention shall be defined according to the protection scope claimed by the claims.

What is claimed is:

1. A route optimization method, comprising:
    looking up, by a current anchor device of a Mobile Node (MN), a binding list of its own management domain to judge whether a Corresponding Node (CN) and an MN have performed location registration in its own management domain;
    acquiring in its own management domain, by the current anchor device of the MN, location information of a current access device of the CN, if the CN and the MN have performed location registration in its own management domain; or remotely acquiring the location information of the current access device of the CN, if the CN and the MN have not performed location registration in its own management domain;
    sending the location information of the current access device of the CN to a current access device of the MN; and
    establishing a transmission tunnel between the current access device of the MN and the current access device of the CN;
    wherein the remotely acquiring the location information of the current access device of the CN comprises:
    receiving, by the current anchor device of the MN, the route optimization request sent from the current access device of the MN, wherein the route optimization request carries a constant location identifier of the CN;
    sending, by the current anchor device of the MN, a paging indication to a home paging control unit of the MN, wherein the paging indication carries the constant location identifier of the CN;
    sending, by the home paging control unit of the MN, a paging request to a home paging control unit of the CN, wherein the paging request carries the constant location identifier of the CN; and
    querying, by the home paging control unit of the CN, the location information of the current access device of the CN, according to the constant location identifier of the CN; sending a paging request to a visited location paging control unit of the CN, so as to acquire the location information of the current access device of the CN, when the CN is in a roaming state; and forwarding the location information of the current access device of the CN to the current anchor device of the MN.

2. The route optimization method according to claim 1, wherein before the establishing the transmission tunnel between the current access device of the MN and the current access device of the CN, the method further comprises:
    acquiring, by the current anchor device of the MN, the location information of the current access device of the MN; and
    sending, by the current anchor device of the MN, the location information of the current access device of the MN to the current access device of the CN.

3. The route optimization method according to claim 2, wherein the sending the location information of the current access device of the CN to the current access device of the MN comprises:
    sending, by the current anchor device of the MN, the location information of the current access device of the CN to a location management module of the current access device of the MN, if a route optimization request received by the current anchor device of the MN is sent from the location management module of the current access device of the MN.

4. The route optimization method according to claim 2, wherein the sending the location information of the current access device of the CN to the current access device of the MN comprises:
    sending, by the current anchor device of the MN, the location information of the current access device of the CN to a handover control module of the current access device of the MN, if the route optimization request received by the current anchor device of the MN is sent from the handover control module of the current access device of the MN.

5. The route optimization method according to claim 1, wherein the querying, by the home paging control unit of the CN, the location information of the current access device of the CN, according to the constant location identifier of the CN, further comprises:
    acquiring, by the current access device of the CN, the location information of the current access device of the MN, through the visited location paging control unit; or
    acquiring, by the current access device of the CN, the location information of the current access device of the MN, through the current anchor device of the CN, after an interaction between the visited location paging control unit and the current anchor device of the CN.

6. The route optimization method according to claim 2, wherein before the establishing the transmission tunnel between the current access device of the MN and the current access device of the CN, the method further comprises:
    determining an initiator for establishing the tunnel.

7. The route optimization method according to claim 6, wherein the determining the initiator for establishing the tunnel comprises:
    determining, by the current anchor device of the MN, the current access device of the MN as the initiator for establishing the tunnel, when the route optimization request sent from the current access device of the MN to the current anchor device of the MN carries a route optimization indication; or
    appointing, by the current anchor device of the MN, the current access device of the CN as the initiator for establishing the tunnel, when the route optimization request sent from the current access device of the MN to the current anchor device of the MN carries no route optimization indication.

8. The route optimization method according to claim 7, wherein before the establishing the transmission tunnel between the current access device of the MN and the current access device of the CN, the method further comprises:
    binding a location relationship between the current access device of the MN and the current access device of the CN, in at least of one of the current access device of the MN and the current access device of the CN.

9. The route optimization method according to claim 8, wherein the binding the location relationship between the current access device of the MN and the current access device of the CN, in at least of one of the current access device of the MN and the current access device of the CN, comprises:
    binding a location relationship between the current access device of the MN and at least of one of the CN and the MN; and
    binding a location relationship between the current access device of the CN and at least of one of the MN and the CN.

10. A route optimization system, comprising:
    a Mobile Node (MN) access sub-system, configured to acquire location information of a current access device of a Corresponding Node (CN) in a CN access sub-system, through a current anchor device of an MN, and establish a transmission tunnel between a current access device of the MN and the current access device of the CN; and
    the CN access sub-system, configured to acquire location information of the current access device of the MN in the MN access sub-system, and establish a transmission tunnel between the current access device of the CN and the current access device of the MN;
    wherein the MN access sub-system comprises the current access device of the MN and the current anchor device of the MN;
    the current anchor device of a Mobile Node (MN) is configured to:
    look up a binding list of its own management domain to judge whether a Corresponding Node (CN) and an MN have performed location registration in its own management domain;
    acquire in its own management domain, location information of a current access device of the CN, if the CN and the MN have performed location registration in its own management domain; and if the CN and the MN have not performed location registration in its own management domain, receive a route optimization request sent from a current access device of the MN, so as to acquire a user identifier of the CN, send an Authentication, Authorization, and Accounting (AAA) request to a current Proxy Transport Authentication Authorization-Function Entity (Proxy TAA-FE), wherein the request carries the user identifier of the CN, acquire the location information of the current access device of the CN from a current anchor device of the CN according to a queried location information of the current anchor device of the CN, and send the location information of the current access device of the CN to the current access device of the MN;
    the current Proxy TAA-FE of the MN is configured to query the location information of the current anchor device of the CN in a Home Transport Authentication Authorization-Function Entity (Home TAA-FE) of the CN, according to the user identifier of the CN, and send the queried location information to the current anchor device of the MN; and
    the current access device of the MN is configured to establish the transmission tunnel between the current access device of the MN and the current access device of the CN.

11. The route optimization system according to claim 10, wherein the CN access sub-system comprises the current anchor device of the CN and the current access device of the CN, wherein
    the current anchor device of the CN is configured to send the location information of the current access device of the MN to the current access device of the CN; and
    the current access device of the CN is configured to receive the location information of the current access device of the MN sent from the current anchor device of the CN, bind a location relationship between the current access device of the CN and the current access device of the MN, and establish the transmission tunnel between the current access device of the CN and the current access device of the MN.

12. The route optimization system according to claim 11, wherein corresponding to the MN access sub-system, the CN access sub-system further comprises at least one of: a second paging control unit, a second TAA-FE, and a second AF, wherein
    the second paging control unit is configured to query the location information of the current access device of the CN according to a constant location identifier of the CN;
    the second TAA-FE is configured to query the location information of the current access device of the CN according to the user identifier of the CN; and
    the second AF is configured to query the location information of the current access device of the CN from the current anchor device of the CN according to the user identifier of the CN.

* * * * *